(12) United States Patent
Goulet

(10) Patent No.: US 11,806,920 B2
(45) Date of Patent: *Nov. 7, 2023

(54) HEAT CURABLE COMPOSITE TEXTILE

(71) Applicant: SAPREX, LLC, Gastonia, NC (US)

(72) Inventor: Robert Jacque Goulet, Gastonia, NC (US)

(73) Assignee: Nelson Global Products, Inc., Stoughton, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/413,353

(22) Filed: May 15, 2019

(65) Prior Publication Data
US 2019/0263049 A1    Aug. 29, 2019

Related U.S. Application Data

(63) Continuation of application No. 15/203,074, filed on Jul. 6, 2016, now Pat. No. 10,293,544, which is a
(Continued)

(51) Int. Cl.
*B29C 63/18* (2006.01)
*B29C 63/06* (2006.01)
(Continued)

(52) U.S. Cl.
CPC .......... *B29C 63/18* (2013.01); *B29C 63/0021* (2013.01); *B29C 63/06* (2013.01);
(Continued)

(58) Field of Classification Search
CPC .. D02G 3/04; D02G 3/12; D02G 3/18; D02G 3/36; D02G 3/38; D02G 3/402;
(Continued)

(56) References Cited

U.S. PATENT DOCUMENTS 1,717,215 A    6/1929  Huber
2,148,164 A    2/1939  Krippendorf
(Continued)

FOREIGN PATENT DOCUMENTS

CH        675984 A5    11/1990
CN       2120185 U    10/1992
(Continued)

OTHER PUBLICATIONS

Supplementary European Search Report dated Aug. 29, 2017, by the European Patent Office for related Patent Application No. 13791680.5.
(Continued)

*Primary Examiner* — Shaun R Hurley
(74) *Attorney, Agent, or Firm* — Moore & Van Allen, PLLC; Henry B. Ward, III

(57) ABSTRACT

A heat curable, circular knitted fabric includes reinforcing and meltable resin fibers that can be cured to form a more rigid material form. In one embodiment, the fabric includes a core spun yarn, wherein the core may be made from glass, carbon, basalt, aramid or metal. The wrap surrounding the core may include resin type fibers such as Poly(p-phenylene sulfide) PPS, Polyetherimide (PEI), Polyether ether ketone (PEEK), Polysulfone (PES), Polyphthalamide (PPA), nylon, polyester, or polypropylene.

20 Claims, 3 Drawing Sheets

Related U.S. Application Data continuation of application No. 13/629,773, filed on Sep. 28, 2012, now Pat. No. 9,388,515.

(51) Int. Cl.
| | | |
|---|---|---|
| *D02G 3/36* | (2006.01) | |
| *B29C 63/00* | (2006.01) | |
| *D04B 21/16* | (2006.01) | |
| *D04B 1/16* | (2006.01) | |
| *D02G 3/40* | (2006.01) | |
| B29L 23/00 | (2006.01) | |
| F01N 13/14 | (2010.01) | |
| F01N 13/18 | (2010.01) | |

(52) U.S. Cl.
CPC ............. *D02G 3/36* (2013.01); *D02G 3/402* (2013.01); *D04B 1/16* (2013.01); *D04B 21/16* (2013.01); *B29C 63/0004* (2013.01); *B29L 2023/001* (2013.01); *D10B 2505/02* (2013.01); *F01N 13/14* (2013.01); *F01N 13/18* (2013.01); *Y10T 442/438* (2015.04)

(58) Field of Classification Search
CPC ...... D29C 63/0021; D29C 63/18; D04B 1/16; D04B 21/16; B29C 63/0021
See application file for complete search history.

(56) References Cited

U.S. PATENT DOCUMENTS

| | | | |
|---|---|---|---|
| 2,688,895 A | 9/1954 | Houghton | |
| 2,924,546 A | 2/1960 | Shaw | |
| 3,053,715 A | 9/1962 | Labino | |
| 3,092,530 A | 6/1963 | Plummer | |
| 3,312,250 A | 4/1967 | Sirignano et al. | |
| 3,616,123 A | 10/1971 | Reynolds et al. | |
| 3,652,375 A | 3/1972 | Johnson | |
| 3,828,119 A | 8/1974 | Warburton et al. | |
| 4,026,381 A | 5/1977 | Conley | |
| 4,054,710 A | 10/1977 | Botsolas | |
| 4,282,284 A | 8/1981 | George | |
| 4,299,884 A | 11/1981 | Payen | |
| 4,428,999 A | 1/1984 | George et al. | |
| 4,655,866 A | 4/1987 | Ferrier | |
| 4,870,887 A | 10/1989 | Tresslar et al. | |
| 5,092,122 A | 3/1992 | Bainbridge | |
| 5,134,846 A | 8/1992 | White | |
| 5,256,459 A | 10/1993 | Carlson | |
| 5,274,196 A | 12/1993 | Weinberg | |
| 5,343,895 A * | 9/1994 | King | F16L 11/085 138/125 |
| 5,413,149 A | 5/1995 | Ford et al. | |
| 5,549,947 A | 8/1996 | Quigley | |
| 5,556,677 A | 9/1996 | Quigley | |
| 5,615,711 A | 4/1997 | Lewis | |
| 5,617,900 A | 4/1997 | Weil | |
| 5,639,552 A | 6/1997 | Fukushima | |
| 5,660,899 A | 8/1997 | Rockney et al. | |
| 5,712,010 A | 1/1998 | Russek et al. | |
| 5,795,835 A | 8/1998 | Bruner et al. | |
| 5,849,379 A | 12/1998 | Gladfelter et al. | |
| 5,972,512 A | 10/1999 | Boisvert et al. | |
| 5,974,784 A | 11/1999 | Feldman | |
| 5,985,385 A | 11/1999 | Gottfried | |
| 6,045,884 A | 4/2000 | Hess et al. | |
| 6,250,193 B1 | 6/2001 | Head | |
| 6,276,401 B1 | 8/2001 | Wilson | |
| 6,527,015 B2 | 3/2003 | Lively | |
| 6,572,723 B1 | 6/2003 | Tilton et al. | |
| 6,610,928 B2 | 8/2003 | Synder | |
| 6,769,455 B2 | 8/2004 | Toas et al. | |
| 6,978,643 B2 | 12/2005 | Akers et al. | |
| 7,007,720 B1 | 3/2006 | Chase et al. | |
| 7,152,633 B2 | 12/2006 | White | |
| 7,544,890 B2 | 6/2009 | Herborth et al. | |
| 8,950,168 B2 | 2/2015 | Heitmann et al. | |
| 9,145,627 B2 | 9/2015 | Wilson et al. | |
| 9,388,515 B2 | 7/2016 | Goulet | |
| 9,976,687 B2 | 5/2018 | Goulet | |
| 10,293,544 B2 * | 5/2019 | Goulet | D02G 3/36 |
| 10,295,109 B2 | 5/2019 | Goulet | |
| 10,591,104 B2 | 3/2020 | Goulet | |
| 2002/0168488 A1 | 11/2002 | Gladfelter et al. | |
| 2005/0126651 A1 | 6/2005 | Sherwin | |
| 2005/0155663 A1 | 7/2005 | Dhellemmes et al. | |
| 2006/0229381 A1 | 10/2006 | Bartko | |
| 2007/0049148 A1 | 3/2007 | Chien et al. | |
| 2007/0131299 A1 | 6/2007 | Kornbleet | |
| 2007/0251595 A1 | 11/2007 | Chen | |
| 2008/0017263 A1 | 1/2008 | Robinson | |
| 2009/0050256 A1 | 2/2009 | Green et al. | |
| 2009/0078499 A1 | 3/2009 | Sikes et al. | |
| 2009/0197044 A1 | 8/2009 | Pelzer et al. | |
| 2009/0277526 A1 | 11/2009 | Merry | |
| 2010/0139197 A1 | 6/2010 | Woodhall | |
| 2010/0154916 A1 | 6/2010 | Jackson et al. | |
| 2010/0154917 A1 | 6/2010 | Batallas et al. | |
| 2010/0201023 A1 | 8/2010 | Piccione et al. | |
| 2010/0263761 A1 | 10/2010 | Niccolls et al. | |
| 2010/0316822 A1 | 12/2010 | Malloy | |
| 2011/0000572 A1 | 1/2011 | Ramaswamy et al. | |
| 2012/0082807 A1 | 4/2012 | Malloy et al. | |
| 2012/0149268 A1 | 6/2012 | Lake et al. | |
| 2012/0291903 A1 | 11/2012 | Ekelund et al. | |
| 2013/0097839 A1 | 4/2013 | Latham et al. | |
| 2013/0299035 A1 | 11/2013 | Laurent et al. | |
| 2013/0306186 A1 | 11/2013 | Goulet | |
| 2014/0020766 A1 | 1/2014 | Kremers | |
| 2014/0090407 A1 | 4/2014 | Piesker | |
| 2015/0000259 A1 | 1/2015 | Dietz | |
| 2016/0311152 A1 | 10/2016 | Goulet | |
| 2018/0023222 A1 | 1/2018 | Zhang et al. | |
| 2020/0217443 A1 | 7/2020 | Lubenow et al. | |
| 2020/0217444 A1 * | 7/2020 | Goulet | B32B 1/08 |

FOREIGN PATENT DOCUMENTS

| | | |
|---|---|---|
| CN | 101119042 A | 2/2008 |
| CN | 101848959 A | 9/2010 |
| CN | 102575115 A | 7/2012 |
| CN | 102654219 A | 9/2012 |
| CN | 109073134 A | 12/2018 |
| DE | 102010028433 A1 | 11/2011 |
| EP | 0327148 A1 | 8/1989 |
| EP | 0877892 B1 | 11/1999 |
| EP | 1772604 A1 | 4/2007 |
| GB | 2166512 A | 5/1986 |
| JP | 07269340 A | 10/1995 |
| JP | 2001289392 A | 10/2001 |
| JP | 2005513226 A | 5/2005 |
| JP | 2005163830 A | 6/2005 |
| JP | 3183361 U | 5/2013 |
| RU | 2303744 C2 | 7/2007 |
| RU | 2380606 C2 | 1/2010 |
| RU | 2438065 C2 | 12/2011 |
| WO | 9732067 A1 | 9/1997 |
| WO | 2000073695 A1 | 12/2000 |
| WO | 2005085608 A1 | 9/2005 |
| WO | 2017181197 A1 | 10/2017 |

OTHER PUBLICATIONS

International Search Report dated Sep. 20, 2013, for related International Patent Application No. PCT/US2013/041391.
Written Opinion dated Sep. 20, 2013, for related International Patent Application No. PCT/US2013/041391.
International Preliminary Report on Patentability dated Nov. 18, 2014, for related International Patent No. PCT/US2013/041391.
Canadian Office Action and Search Report dated Oct. 2, 2018, for related Canadian Patent Application No. 2,919,854.
Decision to Grant dated Sep. 14, 2018, by the European Patent Office for related European Patent No. 13791680.5.

(56) References Cited

OTHER PUBLICATIONS

Office Action dated Apr. 12, 2018, by the European Patent Office for European Patent Application No. 13791680.5.
Notice of Allowance dated Jul. 24, 2019, by the Canadian Intellectual Property Office for Canadian Patent Application No. 2,912,854.
Final Office Action issued by the United States Patent and Trademark Office for U.S. Appl. No. 16/818,395, dated Mar. 8, 2021.
Notice of Allowance issued by the United States Patent and Trademark Office for U.S. Appl. No. 16/818,395, dated Mar. 24, 2021.
Office Action issued by the United States Patent and Trademark Office for U.S. Appl. No. 16/818,395 dated Oct. 6, 2020.
Office Action issued by the Canadian Patent Office for Canadian Patent Application No. 3,082,881, dated Aug. 11, 2021.
Examination Search Report issued by the Canadian Patent Office for Canadian Patent Application No. 3,082,881, dated Jul. 16, 2021.
Office Action issued by the Brazilian Patent Office for Patent Application No. BR112019010119-5, dated Aug. 31, 2021.
Second Office Action issued by the Chinese Patent Office for Chinese Patent Application No. 201780083881.X, dated Jul. 12, 2021.
Office Action issued by the United States Patent Office for U.S. Appl. No. 16/092,838, dated Oct. 1, 2021.
Final Rejection issued by the United States Patent Office for U.S. Appl. No. 16/818,395, dated Nov. 10, 2021.
Restriction Requirement issued by the United States Patent and Trademark Office for U.S. Appl. No. 16/092,838, dated May 14, 2021.
Office Action issued by the European Patent Office for European Patent Application No. 17871914.2, dated Jun. 17, 2021.
Office Action issued by the Brazilian Patent Office for Brazilian Patent Application No. BR112018070774-0, dated Jun. 15, 2021.
Final Rejection issued by the United States Patent and Trademark Office for U.S. Appl. No. 16/092,838, dated Mar. 15, 2022.
Office Action issued by the European Patent Office for European Patent Application No. 17 871 914.2, dated Apr. 13, 2022.
Final Rejection issued by the United States Patent Office for U.S. Appl. No. 16/462,115, dated May 13, 2022.
International search report dated Jul. 5, 2017 for related International Patent Application No. PCT/US2017/027994.
Written opinion dated Jul. 5, 2017, for related International Patent Application No. PCT/US2017/027994.
International search report dated Jan. 30, 2018, for corresponding International Patent Application No. PCT/US2017/062573.
Written opinion dated Jan. 30, 2018 for corresponding International Patent Application No. PCT/US2017/062573.
International Preliminary Report on Patentability dated Oct. 16, 2018, for related International Patent Application No. PCT/US2017/027994.
Saprex LLC International patent application No. PCT/US2017/062573, International Preliminary Report on Patentability, dated May 21, 2019.
Canadian office action issued by the Canadian Patent Office for Canadian Patent Application No. 3,060,052, dated Dec. 9, 2020.
Chinese Search Report issued by the Chinese Patent Office for corresponding Chinese Patent Application No. 2017800265042, dated Dec. 11, 2019, 5 pages.
Chinese Office Action issued by the Chinese Patent Office for corresponding Chinese Patent Application No. 2017800265042, dated Dec. 19, 2019, 12 pages.
Chinese Search Report issued by the Chinese Patent Office for Chinese Patent Application No. 201780083881X, dated Sep. 23, 2020.
Chinese Office Action issued by the Chinese Patent Office for Chinese Patent Application No. 201780083881X, dated Sep. 28, 2020.
Extended European Search Report issued by the European Patent Office for corresponding European Patent Application No. 17783373.8-1010 / 3443254, dated Nov. 27, 2019, 7 pages.

Supplementary European Search Report issued by the European Patent Office for corresponding application EP 17871914 dated Jul. 8, 2020.
European Office Action issued by the European Patent Office for European Patent Application No. 17783373.8, dated Mar. 9, 2021.
Japanese Office Action issued by the Japanese Patent Office for corresponding Japanese Patent Application No. 2019505340, dated Jan. 15, 2020, 16 pages.
Office Action issued by the Japanese Patent Office for corresponding Japanese Patent Application No. 2019-527220, dated Aug. 21, 2020.
Saprex LLC Russian Patent Application No. 2018140073, Office Action, dated May 17, 2019.
Russian Search Report issued by the Russian Patent Office for corresponding Russian Patent Application No. 2019118633, dated Nov. 22, 2019, 2 pages.
Russian Office Action issued by the Russian Patent Office for corresponding Russian Patent Application No. 2019118633, dated Nov. 28, 2019, 14 pages.
Decision to Grant issued by the Federal Service for Intellectual Property for corresponding Russian Patent Application No. 2018140073/06 (066643) dated Jun. 17, 2020, 5 pages.
Bondaletova, L. And Bondaletov, V., "Polymer composition materials". Part I, Tomsk, 2013, pp. 16-63.
Amended Invalidity Contentions filed by defendant, Lincoln Industries on Mar. 29, 2021, in the United States District Court for the District of Nebraska in Case No. 8:20-cv-338-BCB-SMB.
Tighitco Phenolic and Polymide Insulation Blankets webpage, purportedly used or sold by Tighitco, purported Publication Date of Apr. 4, 2003.
Tighitco Phenolic and Polymide Insulation Systems webpage, purportedly used or sold by Tighitco, purported Publication Date of Mar. 7, 2010.
ThermoLinc Elite, purportedly used or sold by Lincoln Industries, purported Publication Date of at least as early as 2016.
Glass Fiber Composite Shell, purportedly used or sold by Bosal, purported Publication Date of Jul. 2, 2017.
Composite Insulation Coating, purportedly used or sold by Thermal Structures, purported Publication Date of at least as early as Jul. 9, 2013.
ThermoJacket S Datasheet, purportedly used or sold by Federal Mogul, purported Publication Date of Mar. 2005.
ThermoJacket S Material Safety Data Sheet, purportedly used or sold by Federal Mogul, purported Publication Date of Sep. 26, 2005.
ThermoJacket S Product Description, purportedly used or sold by Federal Mogul, purported Publication Date of at least as early as 2008.
ThermoJacket R Product Description, purportedly used or sold by Federal Mogul, purported Publication Date of Mar. 24, 2011.
ThermFlex 1212 Product Description, purportedly used or sold by Federal Mogul, purported Publication Date of at least as early as 2008.
ThermFlex 1212 Datasheet, purportedly used or sold by Federal Mogul, purported Publication Date of at least as early as 2008.
ThermFlex 1212 Material Safety Data Sheet, purportedly used or sold by Federal Mogul, purported Publication Date of Aug. 29, 2005.
ThermFlex 1212 (with End Dips) Material Safety Data Sheet, purportedly used or sold by Federal Mogul, purported Publication Date of Aug. 22, 2005.
ThermFlex 1210 Material Safety Data Sheet, purportedly used or sold by Federal Mogul, purported Publication Date of Nov. 14, 2013.
ThermFlex 1210 Product Description, purportedly used or sold by Federal Mogul, purported Publication Date of at least as early as 2008.
High Temperature Sleeving, purportedly used or sold by Techflex, purported Publication Date of May 31, 2010.
Insultherm (FG) webpage, purportedly used or sold by Techflex, purported Publication Date of Mar. 14, 2007.
Insultherm webpage, purportedly used or sold by Techflex, purported Publication Date of Jun. 5, 2010.

(56) References Cited

OTHER PUBLICATIONS

"Hard Coat" insulation a new direction for insulation blanket manufacturer, purportedly used or sold by Firwin Corp., purported Publication Date of Nov. 12, 2008.
Insulation Coating, purportedly used or sold by Firwin Corp., purported Publication Date of Dec. 2008.
Hard Coat Insulation for Engine Parts and Exhausts, purportedly used or sold by Firwin Corp., purported Publication Date of Apr. 6, 2009.
Making Hard (or Soft) Choices, purportedly used or sold by Firwin Corp., purported Publication Date of Oct. 2009.
Performance Evaluation of Firwin Hard Coat Insulation, purportedly used or sold by Firwin Corp., purported Publication Date of Oct. 2009.
Hard-Coat Insulation for Engine Parts and Exhausts, purportedly used or sold by Firwin Corp., purported Publication Date of May 2011.
Firwin HC Hard Coat Insulations—FAQ's, purportedly used or sold by Firwin Corp., purported Publication Date of Nov. 3, 2011.
Firwin Hard Coat Composite Insulation webpage, purportedly used or sold by Firwin Corp., purported Publication Date of Aug. 24, 2012.
Office Action issued by the United States Patent Office for U.S. Appl. No. 16/462,115, dated Jan. 13, 2022.
Office Action issued by the Brazil Patent Office for Brazil Patent Application No. BR112018070774-0, dated Jul. 7, 2022.
Office Action issued by the Brazilian Patent Office for Brazilian Patent Application No. BR112018070774-0, dated Jan. 11, 2023.
Office Action issued by the European Patent Office for European Patent Application No. 17 871 914.2, dated Jan. 31, 2023.
Notice of Allowance issued by the United States Patent and Trademark Office for U.S. Appl. No. 16/818,395, dated Feb. 23, 2023.
Corrected Notice of Allowance issued by the United States Patent and Trademark Office for U.S. Appl. No. 16/818,395, dated Mar. 9, 2023.
Office Action issued by the European Patent Office for European Patent Application No. 17 783 373.8, dated Oct. 20, 2022.
Office Action issued by the Brazilian Patent Office for Brazilian Patent Application No. BR112019010119-5, dated Oct. 27, 2022.
Office Action issued by the United States Patent Office for U.S. Appl. No. 16/092,838, dated Nov. 17, 2022.

* cited by examiner

HEAT CURABLE COMPOSITE TEXTILE

CROSS-REFERENCE TO RELATED APPLICATION

This application is a continuation of U.S. patent application Ser. No. 15/203,074 filed on Jul. 6, 2016, now U.S. Pat. No. 10,293,544, which itself is a continuation of U.S. patent application Ser. No. 13/629,773, now U.S. Pat. No. 9,388,515, filed on Sep. 28, 2012, both for a "Heat Curable Composite Textile", both of which are hereby incorporated by reference in their entirety.

BACKGROUND OF THE INVENTION

The present invention relates generally to heat curable composite textile fabrics that may be cured to form a more rigid, non-flammable, heat resistant and insulating fabric. More specifically, the present invention includes a heat curable, circular or warp knitted fabric containing reinforcing and meltable resin fibers that can be cured to produce a more rigid material form. This composite textile may be used in any application that requires a rigid, heat resistant, non-flammable insulation or sleeve positioned around machine components having a specific shape. Application examples include exhaust insulation covers, pipe insulation covers, machinery covers (such as covers for turbines), rigid fire barrier panels, gun barrel covers, engine component covers, and the like.

Traditional composite structures are typically woven or axial fabric with longitudinal fibers to maximize composite strength and rigidity, but typically require a liquid resin and some form of molding, usually compression molding or vacuum molding, which are time consuming and expensive manufacturing processes that require complex equipment.

Compression molding is a forming process in which a plastic material is placed directly into a heated metal mold, then is softened by the heat, and forced to conform to the shape of the mold as the mold closes. The compression molding starts, with an allotted amount of plastic or gelatin placed over or inserted into a mold. Afterward the material is heated to a pliable state in and by the mold. Shortly there after the hydraulic press compresses the pliable plastic against the mold, resulting in a perfectly molded piece, retaining the shape of the inside surface of the mold. After the hydraulic press releases, an ejector pin in the bottom of the mold quickly ejects the finish piece out of the mold and then the process is finished. Compression molding is a high-volume, high-pressure method suitable for molding complex, high-strength fiberglass reinforcements. Advanced composite thermoplastics can also be compression molded with unidirectional tapes, woven fabrics, randomly oriented fiber mat or chopped strand. The advantage of compression molding is its ability to mold large, fairly intricate parts. However, compression molding often provides poor product consistency and difficulty in controlling flashing, and it is not suitable for some types of parts. Fewer fiber lines are produced and a smaller amount of fiber-length degradation is noticeable when compared to injection molding. Compression-molding is also suitable for ultra-large basic shape production in sizes beyond the capacity of extrusion techniques. Materials that are typically manufactured through compression molding include: Polyester fiberglass resin systems (SMC/BMC), Torlon, Vespel, Poly(p-phenylene sulfide) (PPS), and many grades of PEEK.

Vacuum molding or forming is a simplified version of thermoforming, whereby a sheet of plastic is heated to a forming temperature, stretched onto or into a single-surface mold, and held against the mold by applying a vacuum between the mold surface and the sheet. The vacuum forming process can be used to make most product packaging, speaker casings, and even car dashboards. Vacuum forming is usually, but not always, restricted to forming plastic parts that are rather shallow in depth. A thin sheet is formed into rigid cavities for unit doses of pharmaceuticals and for loose objects that are carded or presented as point-of-purchase items. Thick sheet is formed into permanent objects such as turnpike signs and protective covers. Relatively deep parts can be formed if the form-able sheet is mechanically or pneumatically stretched prior to bringing it in contact with the mold surface and before vacuum is applied. Suitable materials for use in vacuum forming are conventionally thermoplastics. The most common and easiest to use thermoplastic is High Impact Polystyrene Sheeting (HIPS). This is molded around a wood, structural foam or cast/machined aluminum mold and can form to almost any shape.

Each of these methods has disadvantages, including expensive equipment and time-consuming processes. Thus, there is a need for a composite textile material that may be cured and formed into any desired shape, wherein the final material becomes more rigid, tough, and is resistant to heat. Further, there is a need for a more cost-effective, less time-consuming process for manufacturing such a product. It would be desirable to provide a product and method for applying a protective cover or wrap to mechanical components of various shapes and sizes, without having to produce individual molds for each specific cover.

For example, a company may produce thousands of different components of varying shapes and sizes, many of which require a cover or wrap for purposes of insulation and protection against heat and corrosion. In order to provide such covers or wraps for these various components using compression molding or vacuum molding, it would be necessary to provide a mold for each section of covering to be applied to the thousands of corresponding components to be wrapped or covered. Thus, the present invention is directed to a product and process that may be used to apply these wraps or covers to components of any size and shape, without the necessity of providing individual molds for each different size or shape.

BRIEF SUMMARY OF THE INVENTION

In accordance with one aspect of the invention, a heat curable, circular or warp knitted fabric includes reinforcing and meltable resin fibers that can be cured to form a more rigid material form. In one embodiment, the fabric includes a core spun yarn, wherein the core may be made from glass, carbon, basalt, aramid or metal. The wrap surrounding the core may include resin type fibers such as Poly(p-phenylene sulfide) PPS (sold under the trade name Ryton), Polyetherimide (PEI) sold under the trade name Ultem, Polyether ether ketone (PEEK), Polysulfone (PES), Polyphthalamide (PPA), nylon, polyester, or polypropylene. Reinforcing fibers can additionally be added to the wrap. The fabric may contain from about 10% to 100% of the core spun yarn.

In use, the core spun yarn is knitted into a circular or warp knit fabric, which may optionally include reinforcing fibers. The circular knit fabric may then be heat molded into any desired shape to serve as a protective covering for a mechanical or industrial component, or may be cut and sewn into or onto custom parts and then cured on the part or item.

DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 4:
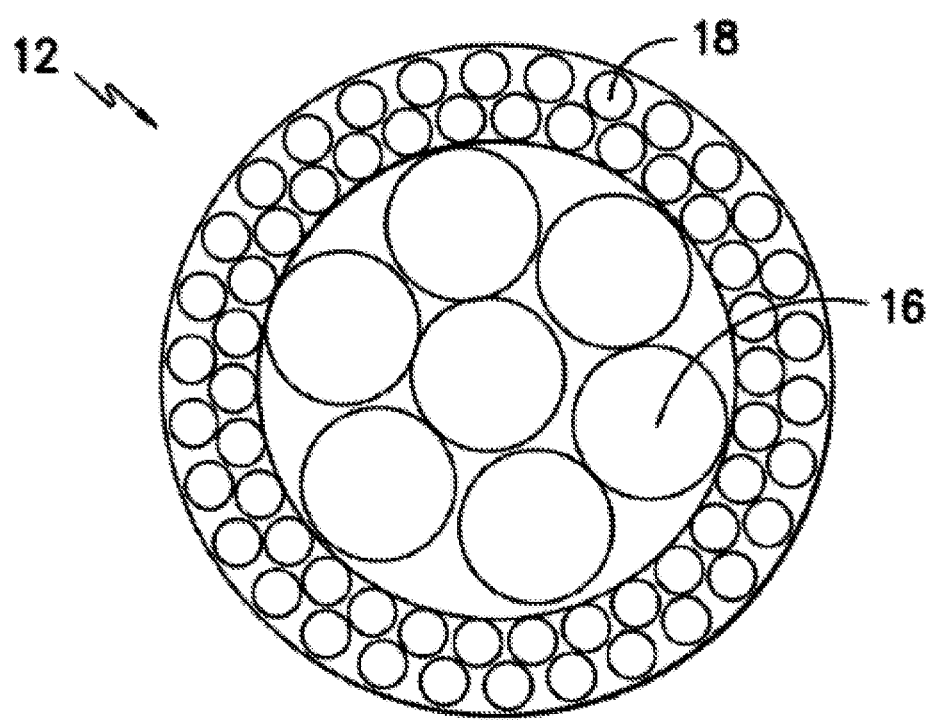
FIG. 4 is a cross-sectional view of one embodiment of a core spun yarn, having a core yarn made from multiple fibers and a meltable wrap, also made from multiple fibers, wherein the wrap is disposed about the core yarn.

The present invention includes, in a first embodiment, a heat curable, knitted fabric 10 containing yarn with a meltable resin outer layer, as well as optional reinforcing fibers, which can be cured to produce a more rigid material form that can be used to serve as a protective wrap or cover 14 for various types of mechanical or industrial components, or other similar applications. In one embodiment, the fabric 10 includes a core spun yarn 12. Typically, core spun yarn is a yarn consisting of an inner core yarn 16 surrounded by staple fibers. A core spun yarn 12 combines the strength and/or elongation of the core thread 16 and the characteristics of the staple fibers which form the outer surface, or the "wrap" 18, as shown in FIG. 4. In the present case, the core spun yarn includes a core 16 preferably made from fibers of glass, carbon, basalt, aramid or metal. The meltable wrap 18 surrounding the core may include one or more of resin type fibers such as Poly(p-phenylene sulfide) PPS (sold under the trade name Ryton), Polyetherimide (PEI) sold under the trade name Ultem, Polyether ether ketone (PEEK), Polysulfone (PES), Polyphthalamide (PPA), nylon, polyester, or polypropylene. The meltable wrap may contain more than one type of resin fiber and may also include reinforcing fibers. In a preferred embodiment, the meltable wrap 18 is made from material having a melting point of at least about 250° F., and preferably at least about 400° F. Reinforcing fibers can additionally be added to the textile composite fabric together with the core spun yarn 12, wherein the reinforcing fibers include but are not limited to glass, carbon, aramid, or metal. The fabric 10 may contain from about 10% to 100% of the core spun yarn 12, depending on the desired properties and function of the final product, and the rest of the fabric 10 may comprise reinforcing fibers or yarns.

Figure 1:
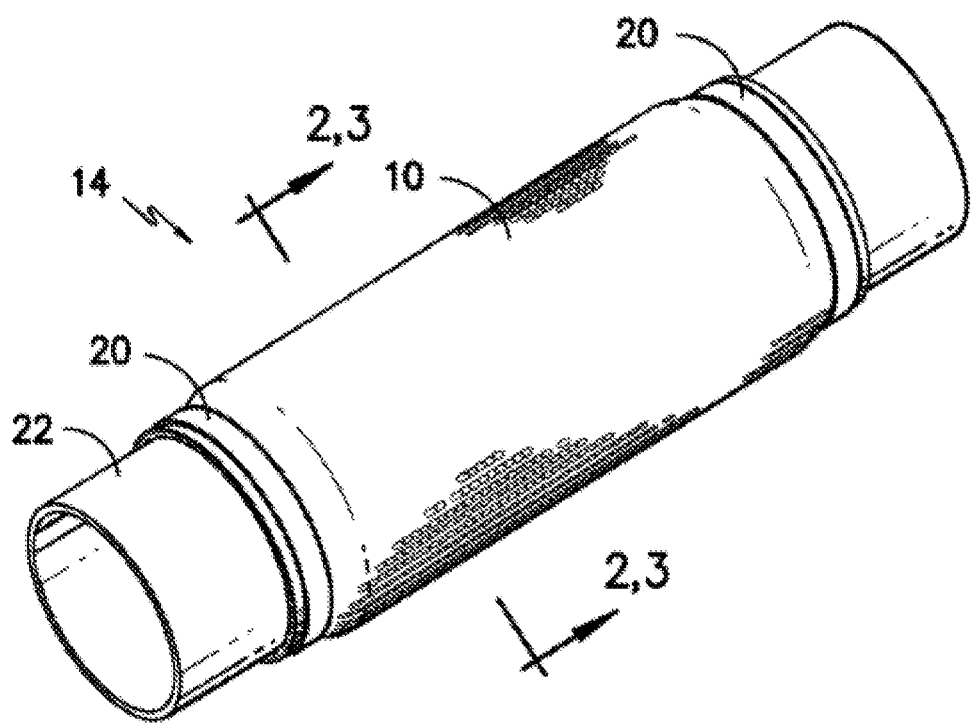
FIG. 1 is a perspective view of one embodiment of a protective cover in accordance with the present invention, wherein a pipe is wrapped with a heat curable knit fabric cover formed at least partially from core spun yarn.
Figure 3:
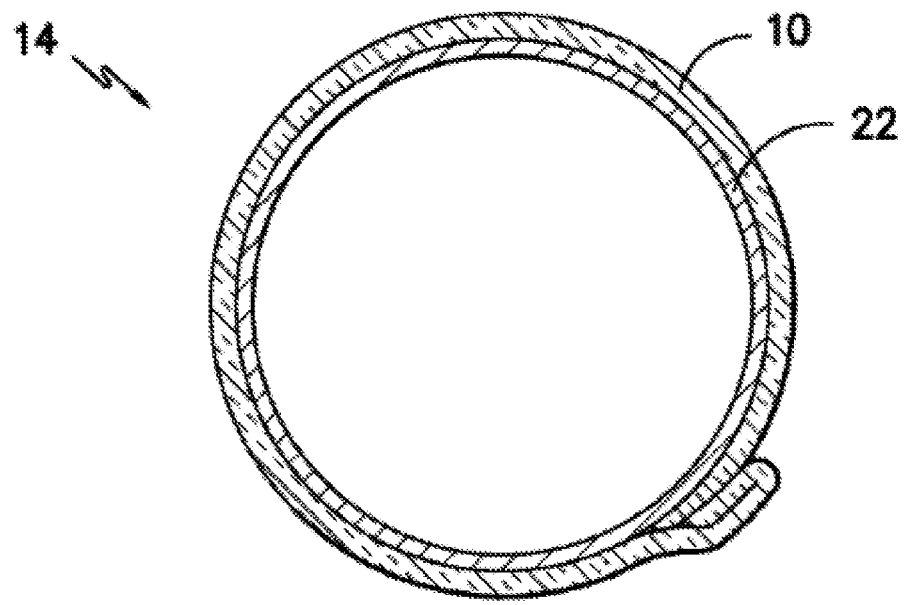
FIG. 3 is a cross-sectional view of one embodiment of a protective cover, wherein the protective cover has been cut and sewn and then fitted onto a pipe, and wherein the seam is shown on an underside of the protective cover.

After the core spun yarns 12 (and optionally, the reinforcing fibers) have been formed into a knit composite textile material (preferably circular or warp knit), the composite textile fabric 10 may be cut and sewn into a preformed article and then positioned on or around a component or item, as shown in FIGS. 1 and 3, wherein the textile material is disposed about a pipe in the form of a cover 14. Then, heat may be applied to the covered component, so that the meltable wrap 18 of the core spun yarn 12 melts (wholly or partially) and then the fabric 10 re-hardens into the desired shape around the component. It is preferable to provide a core spun yarn 12 having a meltable wrap 18 made from material that has a melting point higher than the operating temperature of the component, so that the wrap 18 does not melt during operation or use of the component. Thus, the core spun yarn 12 may be specifically engineered for specific components or purposes, based on the estimated operating temperature of the covered component.

In an alternate embodiment, the yarn may be knitted into a tape or slit into a tape, wrapped around an item and cured as above.

Figure 2:
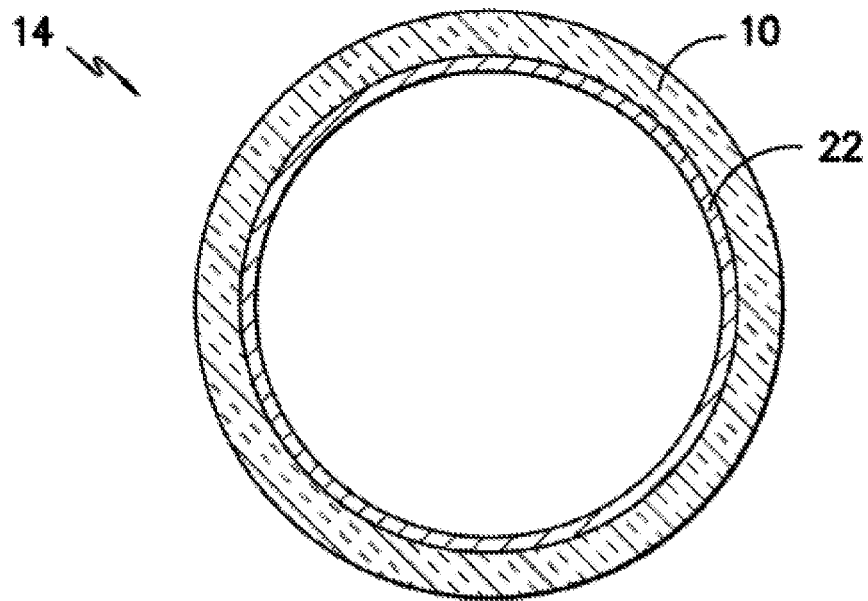
FIG. 2 is a cross-sectional view of one embodiment of the protective cover shown in FIG. 1, wherein the protective cover is a fitted sleeve formed from a circular knit.

In another alternate embodiment, the fabric 10 may be formed of a circular knit sleeve that is manufactured to specific specifications, so that the sleeve fits around a component, such as a pipe 22, as shown in FIGS. 1 and 2. It may be advantageous to provide clamps 20 (or other securing means), as shown in FIG. 1, in order to securely hold the cover 14 onto the pipe or other component.

Alternatively, after the core spun yarns 12 (and optionally, the reinforcing fibers) have been formed into a circular knit composite fabric 10, the composite fabric 10 may be placed into a mold and heated until the wrap 18 around the core 16 of the core spun yarn 12 has melted, in whole or in part. Then, when the composite fabric 10 is allowed to cool, the meltable wrap 18 hardens, so that the composite fabric 10 retains the shape of the mold.

It is contemplated that multiple layers of the composite fabric 10 material may be used together. In one embodiment, the core spun yarns 12 of the first layer are made from the same material as the second layer, which may include core spun yarns 12 alone, or may further include reinforcing fibers. In a second embodiment of the multi-layer composite textile, the core spun yarns 12 of the first layer may be formed of different material from the core spun yarns 12 of the second layer. In this way, the composite fabric 10 may be engineered to produce different features or characteristics, depending on the desired use thereof. Such characteristics may include melting point of the wraps, strength of the material, desired thickness, improved abrasion resistance, reduced cost, and improved environmental stability.

In another embodiment, a single layer knit fabric 10 is formed, wherein the yarns alternate between core spun yarn 12 and reinforcing yarn, such as glass, carbon, aramid or metal. In another embodiment, a three-dimensional knit fabric 10 may be formed, wherein the outer layer is formed of 100% core spun yarn 12, and wherein the spacer material and the inner layer is formed of 100% glass fibers. It should be understood that various types of knit constructions may be used, so long as the core spun yarns 12 are used in the range of about 10% to 100% of the fabric 10, with reinforcing yarns being used for the remainder of the fabric 10.

This composite textile fabric 10 may be used in any application that requires a rigid, heat resistant, non-flammable cover 14, insulation or sleeve positioned around machine components having a specific shape. Application examples include exhaust insulation covers, pipe insulation covers, machinery covers (such as covers for turbines), rigid fire barrier panels, gun barrel covers, engine component covers, and the like.

Because this heat curable composite textile fabric 10 is engineered to be used for a protective cover 14 over industrial and mechanical components, and the like, it need not be developed to exhibit high levels of strength and/or rigidity. Instead, the concept is to provide a textile material that may be easily shaped and molded to fit over these components, and need only have enough rigidity to maintain its shape during use. Thus, using a knit construction (which allows the textile to be formed from thicker and bulkier yarns, but does not maximize strength) is preferable to a weave, which requires less bulky yarns, and maximizes strength and rigidity. Thus, it is contemplated that the composite textile fabric 10 may be formed by utilizing various knit constructions, including but not limited to circular knits, warp knits, multi-layer fabrics and three-dimensional fabrics with spacer materials.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. An insulated exhaust component, the component comprising:
    a hollow tubular member;
    an insulating sleeve positioned around at least a portion of the hollow tubular member, wherein the sleeve comprises first and second layers, each of the first and second layers comprising sleeve reinforcing fibers and a heat curable material, wherein edges of the insulating sleeve are sewn together; and
    wherein the insulating sleeve is configured to form a rigid, heat resistant, and non-flammable cover for at least the portion of the hollow tubular member when the sleeve is heated to a predetermined temperature.

2. The insulated exhaust component set forth in claim 1, wherein the sleeve reinforcing fibers are made from at least one selected from the group consisting of glass, carbon, basalt, aramid and metal.

3. The insulated exhaust component set forth in claim 1, wherein the heat curable material comprises at least one selected from the group consisting of Poly(p-phenylene sulfide), Polyetherimide, Polyether ether ketone, Polysulfone, Polyphthalamide, nylon, polyester and polypropylene.

4. The insulated exhaust component set forth in claim 1, wherein the insulating sleeve further comprises a core spun yarn comprising an inner core yarn surrounded by a wrap including the heat curable material.

5. The insulated exhaust component set forth in claim 1, wherein the second layer comprises a core spun yarn formed into a circular knit structure, wherein the second layer is connected to and overlays the first layer of the insulating sleeve.

6. The insulated exhaust component set forth in claim 1, wherein the insulating sleeve further comprises a core spun yarn comprising between about 10% and about 99% of the cover.

7. The insulated exhaust component set forth in claim 1, wherein the insulating sleeve comprises a knit structure selected from the group consisting of circular knit, warp knit, multi-layer knit and a three-dimensional knit.

8. The insulated exhaust component set forth in claim 1, wherein the insulated exhaust component has a predetermined operating temperature and wherein a melting point of the heat curable material is higher than the operating temperature of the insulated exhaust component.

9. The insulated exhaust component set forth in claim 1, wherein the heat curable material has a melting point of at least 250°F.

10. A method of manufacturing an insulated exhaust component, the method comprising the steps of:
    providing a hollow tubular member;
    forming a rigid, heat resistant, and non-flammable cover positioned around at least a portion of the hollow tubular member, wherein forming the cover further comprises:
        providing an insulating sleeve positioned around at least a portion of the hollow tubular member, wherein the sleeve comprises first and second layers, each of the first and second layers comprising sleeve reinforcing fibers and a heat curable material;
        cutting the insulating sleeve into a desired shape;
        sewing edges of the insulating sleeve together;
        wrapping and covering at least the portion of the hollow tubular member with the insulating sleeve;
        heating the hollow tubular member wrapped in the insulating sleeve to a predetermined temperature; and
        allowing the hollow tubular member and the insulating sleeve to cool, so that the insulating sleeve hardens maintains its shape about the hollow tubular member to form the rigid, heat resistant, and non-flammable cover.

11. The method set forth in claim 10, wherein the sleeve reinforcing fibers are made from at least one selected from the group consisting of glass, carbon, basalt, aramid and metal.

12. The method set forth in claim 10, wherein the heat curable material comprises at least one selected from the group consisting of Poly(p-phenylene sulfide), Polyetherimide, Polyether ether ketone, Polysulfone, Polyphthalamide, nylon, polyester and polypropylene.

13. The method set forth in claim 10, wherein the insulating sleeve further comprises a core spun yarn comprising an inner core yarn surrounded by a wrap including the heat curable material.

14. The method set forth in claim 10, wherein the insulated exhaust component has a predetermined operating temperature, wherein the heat curable material has a melting point, and wherein the melting point of the heat curable material is higher than the operating temperature of the insulated exhaust component.

15. A method of manufacturing an insulated exhaust component, said method comprising the steps of:
    providing a hollow tubular member;
    forming a rigid, heat resistant, and non-flammable cover positioned around at least a portion of the hollow tubular member, wherein forming the cover further comprises:
        providing an insulating textile positioned around at least a portion of the hollow tubular member, wherein the insulating textile comprises first and second layers, each of the first and second layers comprising sleeve reinforcing fibers and a heat curable material;
        cutting the insulating textile into a desired shape;
        placing the insulating textile into a mold;
        heating the insulating textile to a predetermined temperature;
        allowing the insulating textile to cool, so that the insulating textile hardens maintains its shape about the mold to form an insulating sleeve; and attaching said molded insulating sleeve to the hollow tubular member to form the rigid, heat resistant, and non-flammable cover.

16. The method set forth in claim 15, wherein the sleeve reinforcing fibers are made from at least one material selected from the group consisting of glass, carbon, basalt, aramid and metal.

17. The method set forth in claim 15, wherein said heat curable material comprises at least one selected from the group consisting of Poly(p-phenylene sulfide), Polyetherimide, Polyether ether ketone, Polysulfone, Polyphthalamide, nylon, polyester and polypropylene.

18. The method set forth in claim 15, wherein the heat curable material has a melting point of at least 250° F.

19. The method set forth in claim 15, further comprising placing at least one additional layer of the insulating textile into said mold, and attaching said multi-layer protective composite insulating textile to said hollow tubular member.

20. The method set forth in claim 15, wherein the insulated exhaust component has a predetermined operating temperature, wherein the heat curable material has a melting point, and wherein the melting point of the heat curable material is higher than the operating temperature of the insulated exhaust component.

* * * * *